United States Patent
Kubler et al.

(10) Patent No.: US 6,816,063 B2
(45) Date of Patent: *Nov. 9, 2004

(54) RADIO FREQUENCY IDENTIFICATION SYSTEMS AND METHODS FOR WAKING UP DATA STORAGE DEVICES FOR WIRELESS COMMUNICATION

(75) Inventors: Joseph Jay Kubler, Boulder, CO (US); Robert James Grabon, Milwaukee, WI (US)

(73) Assignee: Intermec IP Corp, Everett, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/354,410

(22) Filed: Jan. 30, 2003

(65) Prior Publication Data

US 2003/0112126 A1 Jun. 19, 2003

Related U.S. Application Data

(63) Continuation of application No. 09/413,286, filed on Oct. 6, 1999, now Pat. No. 6,525,648.
(60) Provisional application No. 60/117,965, filed on Jan. 29, 1999.

(51) Int. Cl.[7] .............................................. H04Q 5/22
(52) U.S. Cl. ................ 340/10.33; 340/10.5; 340/572.1
(58) Field of Search ........................... 340/10.33, 10.1, 340/10.3, 10.5, 10.6, 10.52, 10.51, 572.1

(56) References Cited

U.S. PATENT DOCUMENTS

| | | | | |
|---|---|---|---|---|
| 5,686,902 A | * | 11/1997 | Reis et al. ................ | 340/10.2 |
| 5,790,946 A | * | 8/1998 | Rotzoll .................... | 455/343.1 |
| 5,874,902 A | * | 2/1999 | Heinrich et al. ......... | 340/10.51 |
| 5,887,176 A | * | 3/1999 | Griffith et al. ............ | 713/320 |
| 6,249,226 B1 | * | 6/2001 | Harrison et al. ......... | 340/572.1 |
| 6,282,407 B1 | * | 8/2001 | Vega et al. ................ | 455/41.1 |
| 6,550,674 B1 | * | 4/2003 | Neumark .................... | 235/383 |

* cited by examiner

Primary Examiner—Nina Tong
(74) Attorney, Agent, or Firm—Orum & Roth

(57) ABSTRACT

A remote system includes a radio frequency identification (RFID) tag specifically identified by an RF identification signal. The specific RFID tag is associated with a particular remote data transfer device. When identified, the specific RFID tag changes the state of the associated remote data transfer device from a zero power state to an operational state. Limited power-capacity of a remote power supply is used solely for data transfer between the data transfer device and an administrator. Although many RFID signals may be transmitted over time to the location of many remote systems, each of which has an RFID tag, an RFID signal is only infrequently sent to a specific one of the RFID tags. Such an RFID signal is transmitted only to request a data transfer operation with the particular remote data transfer device that is associated with that specific RFID tag. At the end of the data transfer state of that particular remote data transfer device, the state of that data storage device is returned to the zero power state. Each RFID tag may be a passive beam-powered tag. The zero power state, the specificity and periodicity of the RFID signal, the return to the zero power state, and the use of the specific selected passive beam powered RFID tag, combine so that the zero power state is the primary state from a temporal standpoint and for substantial periods of time no power is drawn from the limited power-capacity of the remote power supply. The data storage device may be provided in many different electronic units, all of which may involve data transfer.

17 Claims, 10 Drawing Sheets

| STATE / POWER / TIME OF REMOTE SYSTEM 106 | | | | | | |
|---|---|---|---|---|---|---|
| STATE | 1 | 2 | 1 | 2 | 1 | 2 |
| POWER USED | ZERO | 2 | ZERO | 2 | ZERO | 2 |
| CUMULATIVE POWER USED | ZERO | 2 | 2 | 4 | 4 | 6 |
| TIME | 12 HOURS | MIN | 12 HOURS | MIN | 12 HOURS | MIN |
| KEY : STATE 1 = ZERO POWER (OFF)  STATE 2 = ZERO OPERATIONAL (ON) = 2 POWER UNITS | | | | | | |

Figure 2C

RADIO FREQUENCY IDENTIFICATION SYSTEMS AND METHODS FOR WAKING UP DATA STORAGE DEVICES FOR WIRELESS COMMUNICATION

CROSS REFERENCE TO RELATED APPLICATION

This application is a continuation of U.S. application Ser. No. 09/413,286 filed Oct. 6, 1999, now U.S. Pat. No. 6,525,648 that claims priority from U.S. Provisional patent application Ser. No. 60/117,965 filed Jan. 29, 1999, and entitled "Wireless Wake-up of a Suspended Device." That provisional application is herein incorporated by reference.

BACKGROUND OF THE INVENTION

1. Field of the Invention

The present invention relates to the field of Radio Frequency (RF) tagging, and more particularly, to a particular remote RF transponder (tag) that is specifically identified by an incoming RF identification (RFID) signal, wherein the specifically identified tag wakes up a data storage device from a zero power state to an operational state so that data transfer between the data storage device and a data administrator may take place independently of the RFID signal.

2. Description of Related Art

RF tags have been used in many applications. For example, in a vehicle immobilization application, a vehicle motor will only start when a changeable code is passed from a tag in an ignition key to a circuit that is connected to the vehicle engine. The tag is not electrically connected to the circuit. Also, a complex tag reader is needed for each engine circuit that is to be enabled/disabled. The relatively simple tag in the key has to be in a specific location with respect to the tag reader to allow the reader to access the code on the tag. Further, the tag reader requires power from some source associated with the enabled/disabled circuit. Because of the complexity, expense, and power requirements of the tag reader, this system is limited to expensive, enable/disable circuits with relatively unlimited amounts of on-board power. Further, since the tag and the reader must be adjacent to each other for the reading to occur, no remote communication with the tag is involved in the enabling/disabling operation.

RF tagging systems are also used to prevent theft in the retail industry, e.g., retail sales of electronic equipment. One prior approach to this problem is to place a tag on the item. These systems rely on a reader being able to detect the tag as it leaves a designated retail trade area, and activate an alarm when a stolen item is detected.

In another use of RF tagging systems to prevent theft of retail items in the retail industry, a base station transmits RF signals received by an RF tag. Memory of the RF tag is provided with data that controls an enabler/disabler interface circuit of the tag. An interface circuit controls an external electronic circuit within the retail item. A critical part of the external electronic circuit has states controlled by the interface circuit for enabling and/or disabling operation of the electronic circuit. If the sale of the retail item has not been authorized, for example, the operation of the electronic circuit is not permitted. In this retail anti-theft application, no problem is presented as to maximizing the life of a limited power-capacity power source (such as a battery) contained in an electronic circuit having an infrequently used duty cycle. Further, this type of retail anti-theft application does not present a problem of how to remotely change the data stored in the retail item, nor how to communicate with the retail item after the item has passed through a control point at which a change of the enabling/disabling state occurs if the sale has been authorized. Also, the tag initiates the enabling or disabling functions, but not the actual operation of the electronic circuit for its intended purpose.

RF tags have been used in other applications. For example, attempts have been made to communicate with electronic units that are remote from a base station. The remoteness may be in terms of tens or hundreds of miles separating the base station and the unit, or in terms of the unit being mobile, such as being on a truck that may be difficult to access or service due to distant, unpredictable routes of travel. One prior attempt to solve the communication problem required the electronic unit to remain in a standby state in which power is drawn from a limited power-capacity power source (such as a battery) of the electronic unit merely to maintain continued responsiveness to infrequent RF signals from the remote base station. A typical unit having standby operation may include a clock that causes a dual mode power supply to continuously provide power needed for the standby operation, except when operation for communications is required. Because of the infrequency of the RF signals which request communications, the amount of power used for maintaining the continuous standby state dominates the total power used for the communications. Further, where the communications are intended to transfer large amounts of data, the data storage capacity of the RF tag is inadequate, e.g., is limited to an approximate data storage range between 64 bits and 1024 bits, and more typically about 256 bits.

Other attempts have been made to communicate with electronic units that are remote from a base station. For example, when base station on/off signals are provided by a clock, an interrogation operation may periodically provide the RF tag with power to determine whether the base station is polling the RF tag. As in the standby situation, because of the infrequency of the RF signals which request communications, the amount of power used for providing the periodic power to the RF tag dominates the total power used for the communications. In both such standby and polling situations, high amounts of power are used for operating the clock and for the periodic powering of the tag or the standby power, which are the dominant power usages.

Other attempts have been made to communicate with a unit that is remote from a base station. The unit may be on a truck or railroad car, for example, and is provided with operating power from a battery or power generating sources. An exemplary remote unit of this type is shown in U.S. Pat. No. 4,870,419. In one embodiment a microwave signal is transmitted and received by the remote unit having a logic circuit and memory, a trigger circuit, and a transmitter. The transmitter cycles from a low-power usage quiescent state to a battery-operated operational state. The transmitter is used to transmit the relatively small amount of data that is stored in a memory bank of the unit (e.g., 256 bits). Code rates for microwave antennas of the remote unit are apparently selected so that communications between the remote unit and a central interrogation station may occur as the railroad car passes one or more of the interrogation stations. The trigger circuit is a passive circuit deriving operational power from a triggering signal in the form of a burst of microwave energy or an RF signal from the interrogation station. However, as understood the triggering signal does not attempt to identify a specific one of the remote units that is to be operated. As a result, it appears that any such remote unit that is within the burst of microwave energy, for example, would be triggered and become operational. Also, in the remote unit shown in U.S. Pat. No. 4,870,419, there is a limit to the amount of data to be communicated between the remote unit and the interrogator. The limit is based on railroad or highway speeds and the window of a microwave antenna, for example, indicating that communication occurs only via the microwave or other trigger signal received by the trigger circuit antenna of the unit or sent by the transmitter antenna of the unit. Thus, it appears that only very limited amounts of information can be communicated during a brief period of transmission, which corresponds to the limited amount of information that can be stored in the very low data storage-capacity memory bank of the unit. As a result, there is no provision for continuing the communications between a unit and the interrogation station after the unit passes the central station.

In view of the forgoing, what is needed is a remote RFID tag that is specifically identified by an incoming RFID signal, wherein the specifically identified tag wakes up a high data capacity data storage device from a zero power state to an operational state so that data transfer between the data storage device and a data administrator may take place independently of the RFID signal.

SUMMARY OF THE INVENTION

Broadly speaking, the present invention fills these needs by providing a remote system including a radio frequency identification (RFID) tag that is specifically and periodically identified by an RFID signal. The specific RFID tag is associated with a particular remote data transfer device. When identified, the specific RFID tag changes the state of the associated remote data transfer device from a zero power state to an operational state. In this manner, the limited power-capacity of a remote power supply is used solely for data transfer between the data transfer device and an administrator and not at all for standby or periodic powering of non-data transfer operations.

In the present invention, although many RFID signals may be transmitted over time to the location of many remote systems, each of which has an RFID tag, an RFID signal is only infrequently sent to a specific one of the RFID tags. That is, such an RFID signal is transmitted only to request a data transfer operation with the particular remote data transfer device that is associated with that specific RFID tag. Further, at the end of the operational (i.e., data transfer) state of that particular remote data transfer device, the state of that data storage device is returned to the zero power state. Each RFID tag is preferrably a passive beam-powered tag. As a result of factors such as: (1) the zero power state, (2) the specificity and periodicity of the RFID signal, (3) such return to the zero power state, and (4) the use of the specific selected passive beam-powered RFID tag, the zero power state is the primary state from a temporal standpoint, such that for substantial periods of time no power is drawn from the limited power-capacity of the remote power supply.

Another aspect of the present invention is that the data storage device may be provided in many different electronic units, all of which may involve data transfer. Such units may include, for example, one or more computers, databases, cellular telephones, sensors that generate data, etc. In this manner, the data storage capacity of the remote system is not limited to the inherently very limited data storage capacity of the passive beam-powered RFID tag.

Yet another aspect of the present invention is to provide the remote system with a wireless local area network (WLAN) accessible to a particular remote data storage device for communicating with an administrator that may request a data transfer operation with that particular remote data storage device. The data transfer is effected over the WLAN and may be data transferred to or from, or both to and from, the particular remote data storage device. In any case, the data transfer may be between the administrator and the particular remote data storage device, or between the particular remote data storage device and another remote unit serviced by the administrator, e.g., a system that monitors or provides the data that is transferred.

A further aspect of the present invention relates to the particular remote system being mobile. For example, the passive beam-powered RFID tag and the particular remote data storage device may be mounted on a truck for monitoring the kind and amount of cargo carried by the truck at any given time. Or, such tag and data storage device may be part of a mobile cellular telephone. In these cases, the WLAN enables a data transfer operation to take place with the particular remote data storage device independently of the incoming RFID signal. As a result, once the specific RFID tag has been selected, the incoming RFID signal is no longer needed, and data transfer with the particular remote data storage device takes place via the WLAN or other suitable wireless communication connection.

In still another aspect of the present invention, a selected remote data transfer device, including a particular remote data storage device and WLAN, are provided with operating power only when the specific RFID tag associated with such particular remote data storage device and WLAN has been selected.

Additionally, an aspect of the present invention includes a method of periodically providing data to or from a remote area. The method may include operations of providing a plurality of individual data storage units in the remote area. Each of the remote data storage units is normally in a zero power (OFF) state, has an operational (ON) state for operation, and has a data storage capacity that is large relative to that of a typical RFID frequency tag . A unique RFID signal is periodically transmitted to the remote area only at a separate specific time at which it is desired to provide data to or from a particular one of the data storage units that corresponds to the unique signal. Thus, each unique individual one of the RFID signals is designed to identify only the particular one of the remote data storage units that is selected. In response to the unique RFID signal, the particular one of the data storage units is thus selected, e.g., identified, and then caused to be in the operational state. In the operational state, data is transferred to and from that selected data storage unit via a wireless local area network (WLAN). Thus, data communication is established with a particular remote data storage unit only when that data storage unit is selected and is in the operational state, and independent of the RFID signal.

Another aspect of the present invention involves a plurality of service provider units for use at remote locations. The provided services may relate to data transfer, with each service provider having data unique to it. Each unit has a power supply with a low total power-capacity. A particular unit responds to a request unique to it from a requesting station located away from the remote location of the unit. The requesting station transmits to the remote location periodic unique service-request signals. The signals include a signal requesting data-type data transfer service from a specific one of the service provider units. The data-type data transfer service is different from more frequent polling-type data transfer that may occur in prior art systems for frequently determining whether the requesting station is currently attempting to locate the particular unit. The service provider unit may include a radio frequency identification (RFID) tag responsive to only one of the unique service-request signals for generating a wake-up signal. A particular remote service provider is associated with a specific one of the RFID tags. That particular provider has a zero power (OFF) state when no power is provided to it and has an operational (ON) state when power is supplied to it. In the operational state the particular service provider transfers its particular data with the requesting station. A power source is connected to the particular service provider to supply the low total amount of power of the low total power-capacity. The power source is used only for the infrequently used data-type data transfer service. That is, because there is no use of such power source for frequent polling-type data transfer, substantially all of the low total power-capacity of the power source is available for the infrequently requested-data-type data transfers. As a result, almost all of the useful life of a battery having the low total power-capacity is used for providing the infrequently requested-data-type data transfers.

Other aspects and advantages of the invention will become apparent from the following detailed description, taken in conjunction with the accompanying drawings, illustrating by way of example the principles of the invention.

BRIEF DESCRIPTION OF THE DRAWINGS

The foregoing and other objects, aspects and advantages will be better understood from the following detailed description of preferred embodiments of the invention with reference to the drawings that include the following:

FIGS. 2A and 2B are schematic diagrams of preferred embodiments of the present invention, each showing a base station transmitting an RFID signal to a passive radio frequency identification tag, wherein FIG. 2A shows one antenna for each of the base station and the radio frequency tag, and where FIG. 2B shows two antennas for each of the base station and the radio frequency identification tag.

FIG. 2C is a diagram showing the relative power consumption during the zero power state and an operational state of the remote systems.

DETAILED DESCRIPTION OF THE PREFERRED EMBODIMENTS

An invention is described for RF tagging in which a specific RFID tag is selected to periodically change the state of an associated particular remote data transfer device from a zero power state to an operational state. In the operational state, data transfer between the particular data transfer device and an administrator takes place. More particularly, the invention is described with respect to use of the limited power-capacity of a remote power supply predominantly for such data transfer between the data transfer device and the administrator and preferably not at all for standby or periodic powering of non-data transfer operations. It will be obvious, however, to one skilled in the art, that the present invention may be practiced without some or all of these specific details. In other instances, well known process operations have not been described in detail in order not to obscure the present invention.

Figure 1:
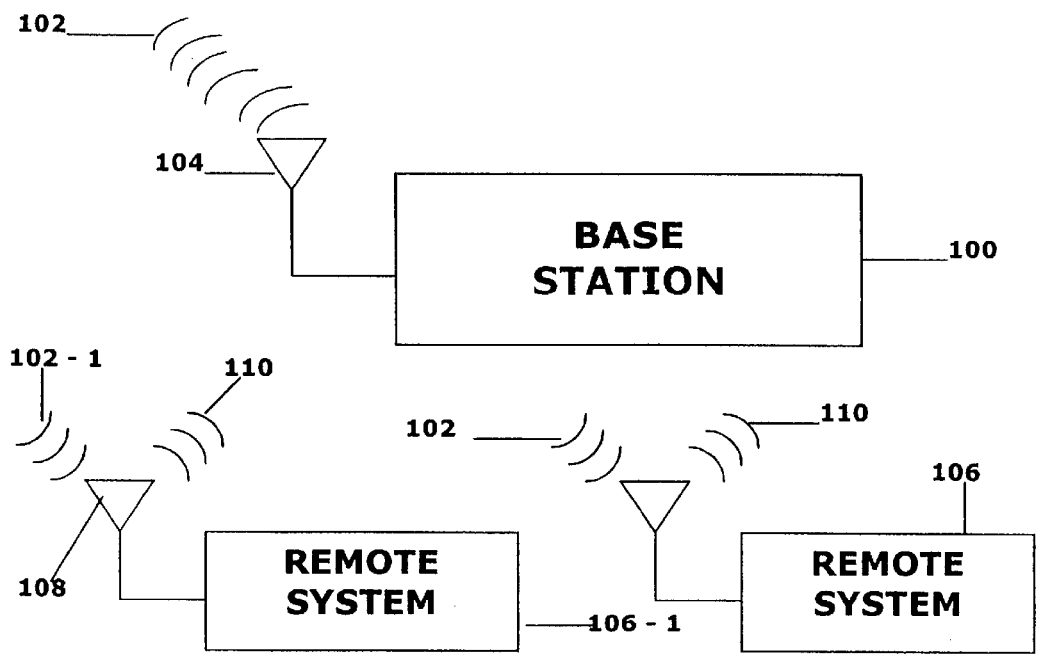
FIG. 1 is a schematic diagram showing a preferred embodiment of the present invention, wherein there are a plurality of remote systems, each of which receives RFID signals from a base station for waking up a remote system that is normally in a zero power state.

FIG. 1 shows a preferred embodiment of the present invention in which a base station 100 periodically transmits radio frequency identification (RFID) signals 102 via an antenna 104 to a remote location at which there may be one remote system 106, and preferrably a plurality of the remote systems 106. Particular ones of the remote systems are referred to below as 106-1, 106-2, etc. A unique one of the RFID signals 102, designated 102-1 for example, is received by each remote system 106 via an antenna 108. Only one selected particular remote system, the remote system 106-1 for example, is identified by the unique signal 102-1 and is provided with RF energy by such signal 102-1. The energy from the signal 102-1 is used to change the state of the particular remote system 106-1 from a normally zero power (or OFF) state to an operational (or ON) state. In the operational state, the selected particular remote system 106-1 identified by the signal 102-1 initiates a data transfer, which may, for example, be in the form of data transfer RF signals 110 sent from the antenna 108 of the remote system 106-1 to the base station 100.

Figure 2A:
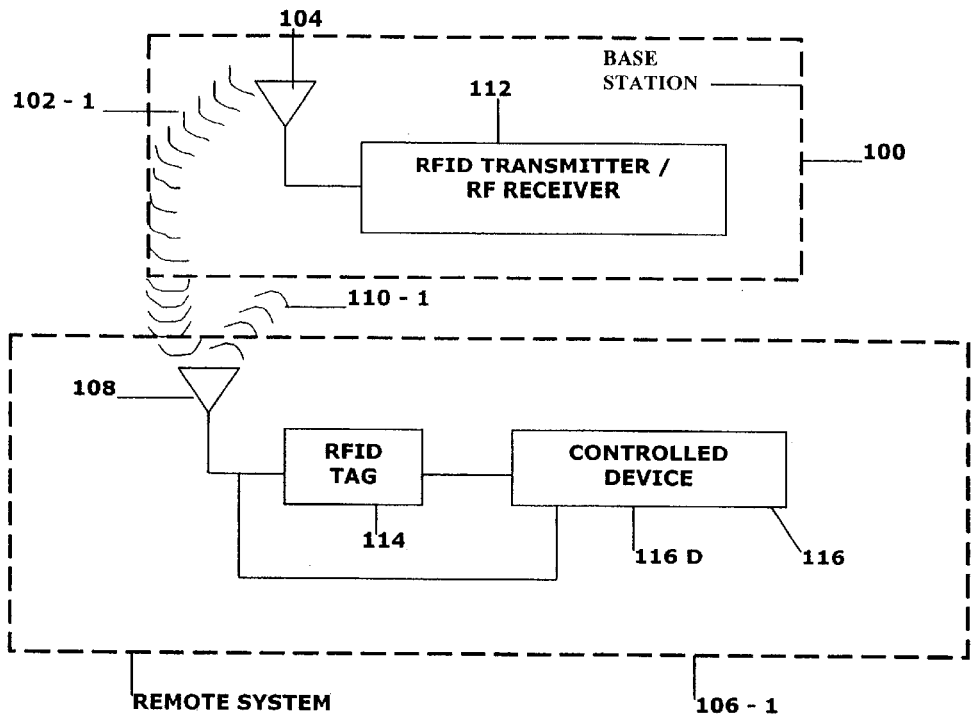
Figure 2B:
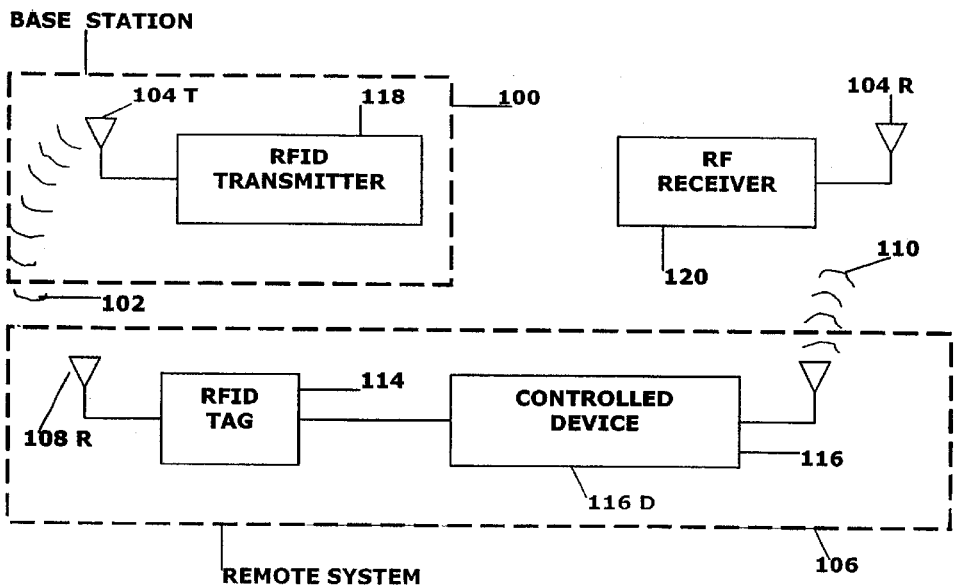

FIGS. 2A and 2B show respective second and third preferred embodiments of the present invention, each embodiment including the base station 100 and at least one of the remote systems 106. In FIG. 2A, the base station 100 includes an RFID transmitter/receiver 112 for transmitting the unique RFID signals 102 to the remote systems 106. The RF transmitter/receiver 112 also receives the data transfer signals 110 from the selected remote system 106. The base station 100 may directly use the transferred data of the data transfer signals 110, or may distribute such data to other devices (not shown) as appropriate.

FIG. 2A shows the second preferred embodiment of one of the remote systems 106, such as the system 106-1. Each of the systems 106 includes a radio frequency identification (RFID) transponder, or tag, 114. Associated with a specific tag 114, the remote systems 106 also include a controlled device 116 such as an electronic circuit. The reference to controlled devices indicates that the state of the controlled devices 116 is controlled by the associated tag 114. In the preferred embodiments of the present invention, the controlled device 116 is a remote data transfer device 116D. FIG. 2A shows the remote system 106-1 using the antenna 108 for both receiving the incoming RFID signal 102-1 and transmitting the outgoing data transfer signal 110, which for the particular remote system 106-1 is the signal 110-1. The incoming RF signal 102-1 and the outgoing data transfer signal 110-1 may each be at the same frequency, such as 2.45 GHz.

FIG. 2B shows the third embodiment in which the base station 100 may include a separate RF transmitter 118 having a separate transmitter antenna 104T. A separate RF receiver 120 is provided with a different receiver antenna 104R. In this manner, the incoming RF signal 102 may have one frequency, such as 900 MHz for example, and the outgoing data transfer signal 110 may have a different frequency, such as 2.45 GHz, for example.

The RF receiver 120 may represent a user of data positioned at a location which may be remote from the base station 100 and from the remote system 106. For example, the RF receiver 120 may be a requesting station that communicates via a modem (not shown) with the RF transmitter 118 to request a data transfer from a particular one of the remote systems 106, e.g., the remote system 106-1. The RF transmitter 118 may also request that specific data be transferred without specifying which remote system 106 is storing that specific data. Alternatively, the RF transmitter 118 may serve as controller for a data storage device. In the latter example, the transmitter 118 serving as a controller will specify which of the remote systems 106-1, 106-2, etc. currently stores the requested data, and will transmit the unique RFID signal 102-1, 102-2, etc. properly coded to identify the particular remote system 106-1, 106-2, etc. that has the requested data.

FIG. 2C describes a zero power state in which the controlled device 116 primarily exists. The zero power state, also referred to as an "OFF" state, is described in FIG. 2C as state 1 in which the controlled device 116 uses no (i.e., "zero") power. FIG. 2C also shows an operational state 2 of the controlled device 116, which state is identified by "ON" and is shown using an exemplary 2 power units. When the controlled device 116 is the remote data transfer device 116D, for example, and the remote data transfer device 116D is mobile, for example, the periods of time during which the remote data transfer device 116D is in the zero power state 1 greatly exceed the periods of time during which the remote data transfer device 116D is in the operational state 2. For example, typically data transfer is required with a remote data transfer device 116D twice per day. Assuming 2 megabytes of data must be transferred, each data transfer may last 30 seconds, for example. Thus, each day the remote data transfer device 116D would be in the zero power state about 23 hours and 59 minutes, and would only be in the operational state about 1 minute. It is to be understood that the exemplary 2 megabytes of data to be transferred by far exceeds the data storage capacity of a typical RFID tag 114. Therefore, if the amount of data to be transferred is much less than 2 megabytes, the remote data transfer device 116D would be in the operational state much less than 1 minute per day.

The cumulative power used by the controlled device 116 in one day is shown based on the power used in only the operational states, e.g., two power units per operational state times the exemplary two operational states equaling four power units. In the prior art, the cumulative power used includes that required for the operational state, plus the much greater amount of power for standby operation. Thus, the total power used in the polling and standby examples is greater by the significant amount required for the polling and standby functions. As described below, all of the power in a remote system 106 is available for powering the controlled device 106 in state 2, the operational state. The elimination of power for the polling and standby functions eliminates use of what is "wasted" power resulting in a substantial improvement in efficiency of use of a limited amount of power that is available at the remote system 106.

Figure 3A:
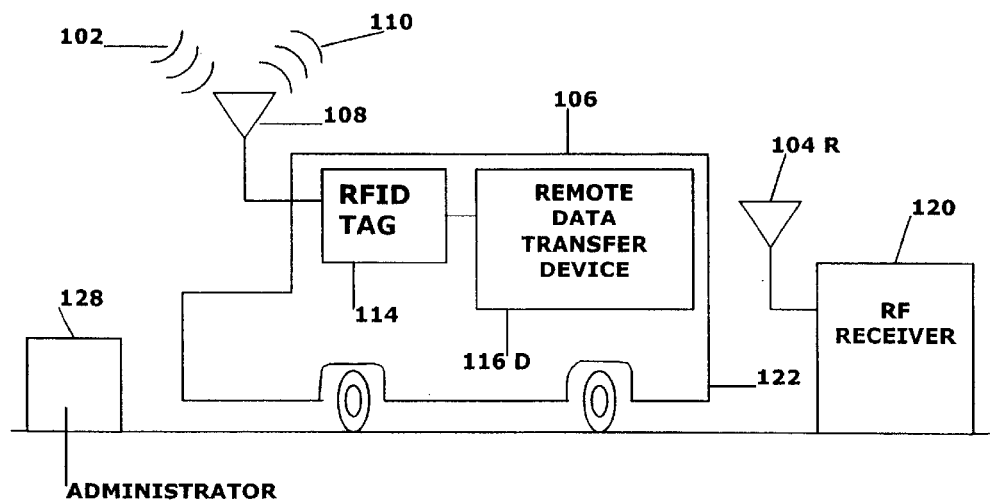
FIG. 3A is a schematic diagram of a preferred embodiment of the present invention showing a remote system mounted for movement relative to a base station.

FIG. 3A shows the arrangement of FIG. 1, wherein each of the remote systems 106 is provided as a fourth embodiment of the present invention. FIG. 3A shows the remote system 106 as being mounted on a vehicle such as a truck 122 for movement at locations remote from the base station. 100. The remote systems 106 shown in FIG. 3A may each be provided with antennas 104R of the RF receiver 120 shown in FIG. 2B, or may each be provided with the one antenna 104 of the RFID transmitter/RF receiver 112 as shown in FIG. 2A. Such remote systems 106 may also have the one antenna 108 for the RFID tag 114 and controlled device 116 as shown in FIG. 2A. The controlled device 116 may be the remote data transfer device 116D, for example.

The timing of the transmission of the RFID signals 102 transmitted by the antenna 104T may be controlled by an administrator 128 such that the RFID signals 102 are transmitted only at a specific time at which it is desired to have data transfer with a particular one of the remote data transfer devices 116D. The administrator 128 may also determine which of many units will receive the outgoing data transfer signals 110. For example, as shown in FIG. 2A, the RFID transmitter/RF receiver 112 may receive the data transfer signals 110. On the other hand, if the unit that needs the data to be transferred (i.e., the "requesting unit") is the RF receiver 120 shown in FIG. 3A as being remote from the administrator 128, that RF receiver 120 may receive the outgoing data transfer signals 110.

Figure 3B:
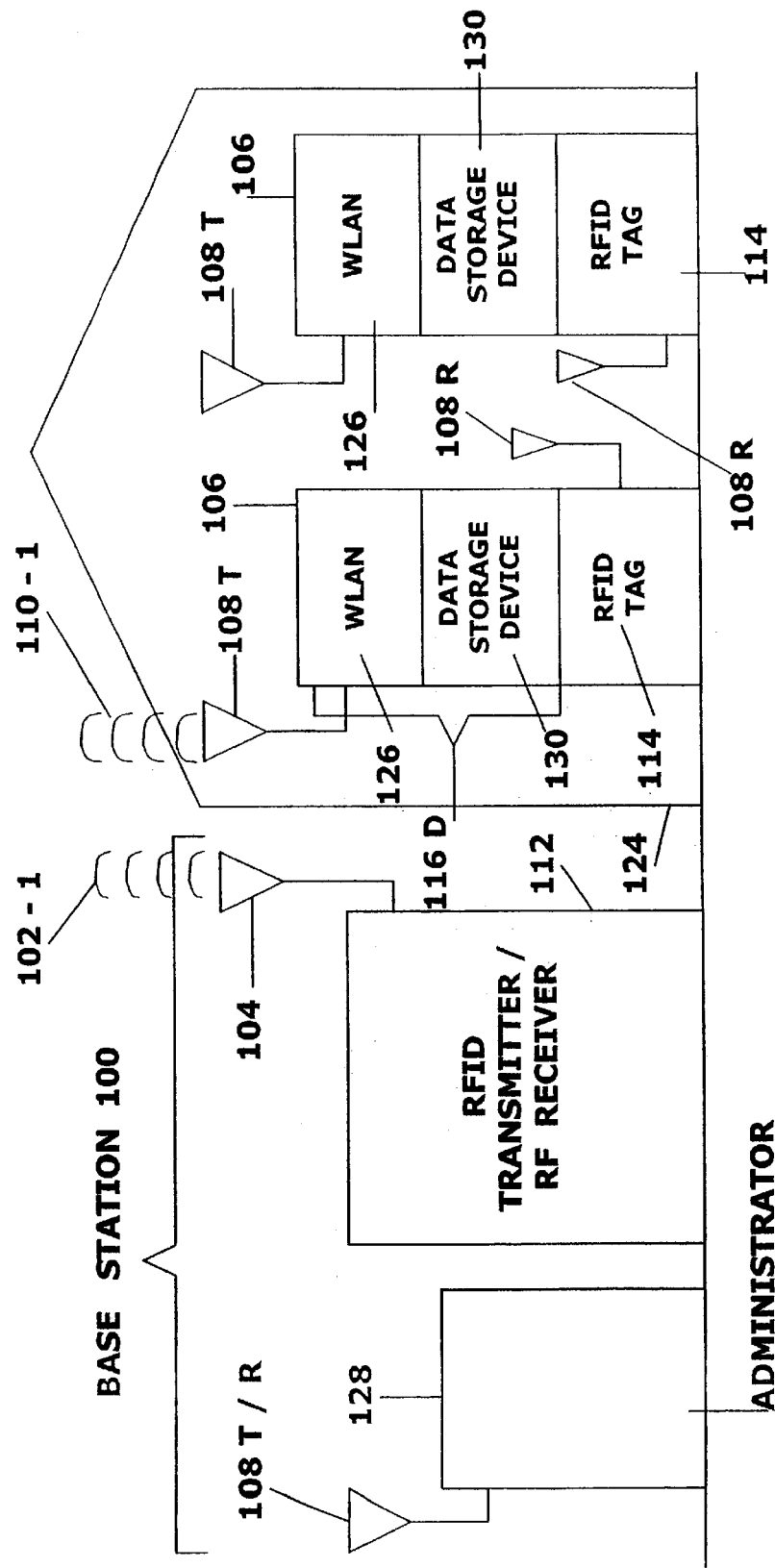
FIG. 3B is a schematic diagram of a preferred embodiment of the present invention showing a plurality of stationary remote systems mounted in one location for receiving RFID. signals from a base station remote from the one location.

FIG. 3B shows the arrangement of FIG. 1, wherein each of the remote systems 106 is provided as a fifth embodiment of the present invention. FIG. 3B shows each of the remote systems 106 as one of a plurality of stationary remote systems 106 mounted at a fixed location (e.g., in a building 124) for receiving the RFID signals 102 from the base station 100 that is remote from the building 124. The remote systems 106 shown in FIG. 3B may each be provided with the separate antennas 104T and 104R of the respective RFID transmitter 118 and RF receiver 120 as shown in FIG. 2B. Alternatively, as shown in FIG. 3B each remote system 106 may be provided with the one antenna 104 of the RFID transmitter/RF receiver 112. Such remote systems 106 may also have the one antenna 108 for the RFID tag 114 and controlled device 116 as shown in FIG. 2A. Alternatively, as shown in FIG. 3B each remote system 106 may be provided with the separate antenna 104R of the RFID tag 114 and the separate antenna 108T of the controlled device 106. The controlled device 116 may be the remote data transfer device 116D, for example, including a data storage device 130 and a wireless local area network (WLAN) 132. The timing of the transmission of the RFID signals 102 transmitted by the antenna 104 may be controlled by the administrator 128 such that the RFID signals 102 are transmitted only at a specific time at which it is desired to have data transfer with a particular one of the remote data transfer devices 116D. The administrator 128 may also determine which of many units will receive the outgoing data transfer signals 110, which may be in the manner described above with respect to FIG. 3A.

In the embodiments shown in FIGS. 3A and 3B, the base station 100 periodically transmits the radio frequency identification (RFID) signals 102 via the antenna 104 to the remote location at which the respective truck 122 or building 124 is located. Particular ones of the remote data transfer devices are designated 116D-1, 116D-2, etc. in the discussion below. Considering FIG. 3B, a unique one of the RFID signals 102-1, for example, identifies only the remote data transfer device 116D-1 and is provided with RF energy by such signal 102-1. The energy from the signal 102-1 is used to change the state of the particular remote data transfer device 116D-1 from the normally zero power (or OFF) state to the operational (or ON) state. In the operational state, the selected particular remote data transfer device 116D-1 identified by the signal 102-1 may initiate a data transfer, which may, for example, be in the form of the data transfer RF signals 110-1 sent from the antenna 108T-1. In a preferred embodiment, in the operational state the selected particular remote data transfer device 116D-1 identified by the signal 102-1 may also receive updated data from the administrator 128 via an antenna 108T/R, or all of the remote data transfer devices 116D may be selected by the RFID signals 102 to be rendered operational and receive the data update.

Figure 4:
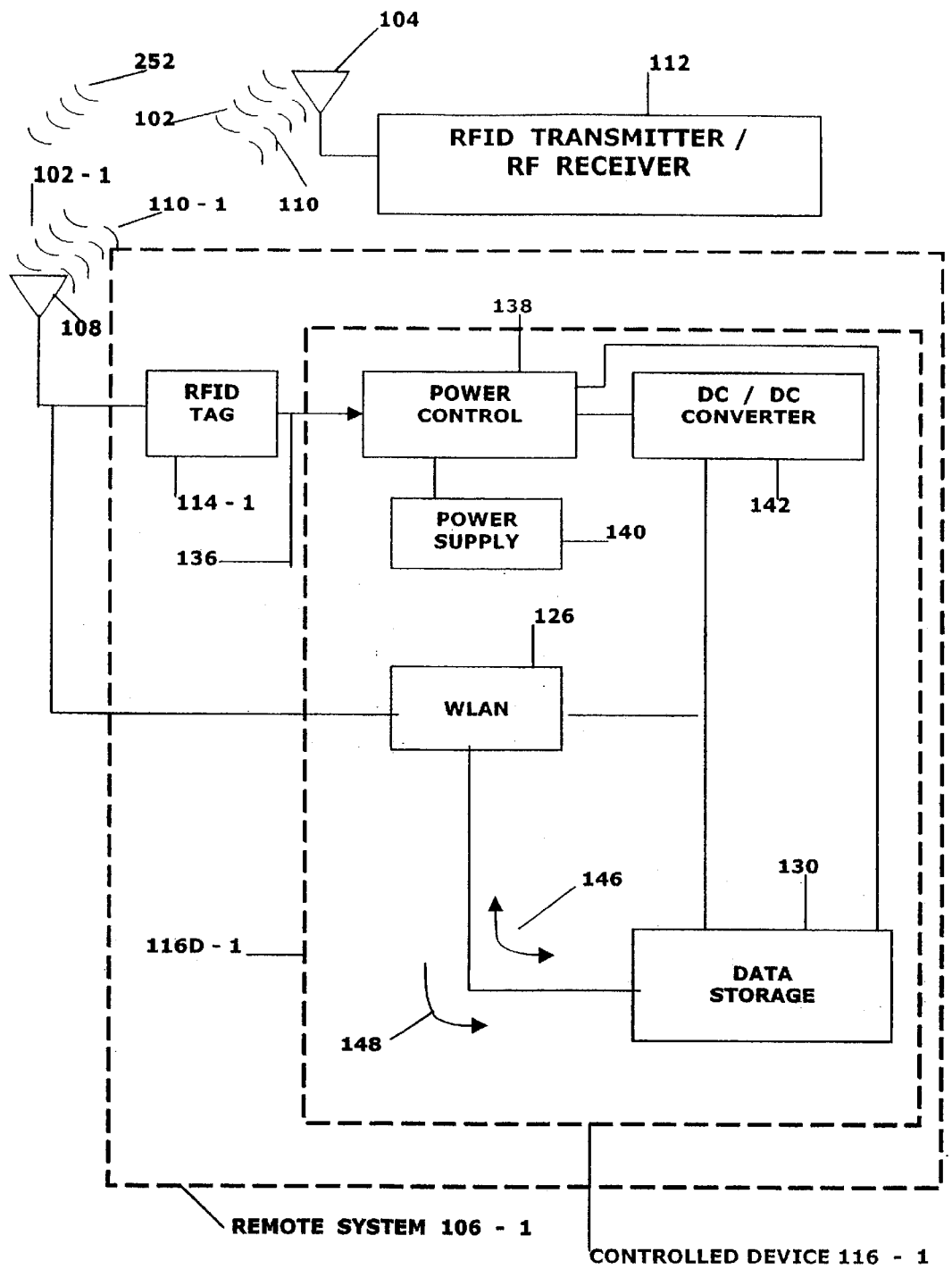
FIG. 4 is a schematic diagram of a preferred embodiment of the present invention showing the remote system including a controlled device having a power supply controlled by an RFID tag to operate a data storage device.

FIG. 4 shows additional details of one controlled device 116 which is part of a particular remote system 106, e.g., system 106-1. The unique RFID signal 102-1 identifies only the remote data transfer device 116D-1, which is provided with RF energy by such signal 102-1. In response to the energy from the signal 102-1, the RFID tag 114-1 generates the wake-up signal 136. The wake-up signal 136 is applied to a power control circuit 138 to connect power from a power supply 140 to a DC/DC converter 142. The connection of the power to the converter 142 represents a change in the state of the remote data transfer device 116D-1 from the OFF state 1 to the operational (ON) state 2. The power supply 140 stores a limited amount of power, such that there is a limited power capacity available to the remote data transfer device 116D-1 for the operational (ON) state 2. For example, if the power supply 134 is a battery such as a model LSR 18650 supplied by Toshiba of Japan, then about 1.350 Ampere-hours is the total power available until the battery must be replaced or recharged. Since the system 106-1 is a "remote" system, it is costly and inconvenient to replace or recharge the power supply 140. Thus, it is important to have as long a useful life of the power supply 140 as possible. In the present invention, such long useful life is provided by using no power for purposes of standby or polling operations of the remote system 106. Instead, the remote system 106 only uses power for the operations during state 2. As an example, with the exemplary data transfer parameters and assumptions described above in reference to FIG. 2C for state 2, and with a system 106-1 having a radio with present technology and using an operating current of 80 milliAmperes only for operations during state 2, a reasonable estimate of the time that the above 1.350 Ampere-hour battery would supply such radio is about three years. Such useful life is substantially longer than an estimated useful life of from three to five days of the above-described prior art polling using the same 1.350 Ampere-hour battery The power available using the above-described limited power-capacity available from the power supply 134 would be all the useful life of the power supply 134. The elimination of the power required for polling, which is "wasted" power, is a substantial improvement in efficiency of use of the limited amount of power that is available from the power supply 134.

In the embodiment shown in FIG. 4, the DC/DC converter 142 supplies power to the WLAN 126 and to the data storage device 130. In response to the power, the data storage device 130 is in the operating state 2, and may output a data output signal 146 to the WLAN 126, or may receive a data input signal 148 from the WLAN 126. The data output signal 146 and the data input signal 148 may collectively have a duration based on the amount of data requested from the data storage device 130 or the amount of data being sent to the data storage device 130, for example. Such duration may also depend on other factors, such as those unique to the RF receiver 120 as the requesting device, or to the RF transmitter/receiver 112 as the requesting device. The WLAN 126 transmits the output signal 146 as part of the data transfer signal 110-1 to the appropriate unit, such as the RF transmitter/receiver 112 or the RF receiver 120 (which represents the requesting device). Similarly, the WLAN 126 receives the input signal 148 as part of the data transfer signal 110-1. Over line 149, the power control 138 may monitor the data transfer performed by the data storage device 130. When the requested data transfer has been completed, the power control 138 disconnects the power supply 140 and returns the controlled device 116-1 to the zero power state 1.

In greater detail, the data transfer described above may be the transfer of data that is stored in the data storage device 130 of the data transfer device 116D-1, for example. In this situation, the device 130 may be a disk drive, such as a model Viper 340 sold by Integral Peripherals. The data storage device 130 used in a particular data transfer device 116D may have any desired data storage capacity to suit the functions of the user units supported by the data storage device 130. In particular, the above disk drive may have a data storage capacity of 340 Mbytes, for example. Regardless of the data storage capacity of the data storage device 130, the capacity will substantially exceed that of the RFID tag 114 with which the device 130 is associated.

When such data is the data incoming as represented by the signal 148, the incoming data is stored in the data storage device 130. When the data storage device 130 is a cellular telephone, for example, the wake-up signal 136 may be a ringer pulse, and the data may be digital representations of voice messages, or be digital data, to be processed by or stored in the cellular telephone. Alternatively, a sensor that takes measurements of functions such as those of a human body, for example, may generate data that is to be stored or processed remotely. Accordingly, the data to be transferred may be any type of data that is to be transferred to or from a remote location.

Figure 5:
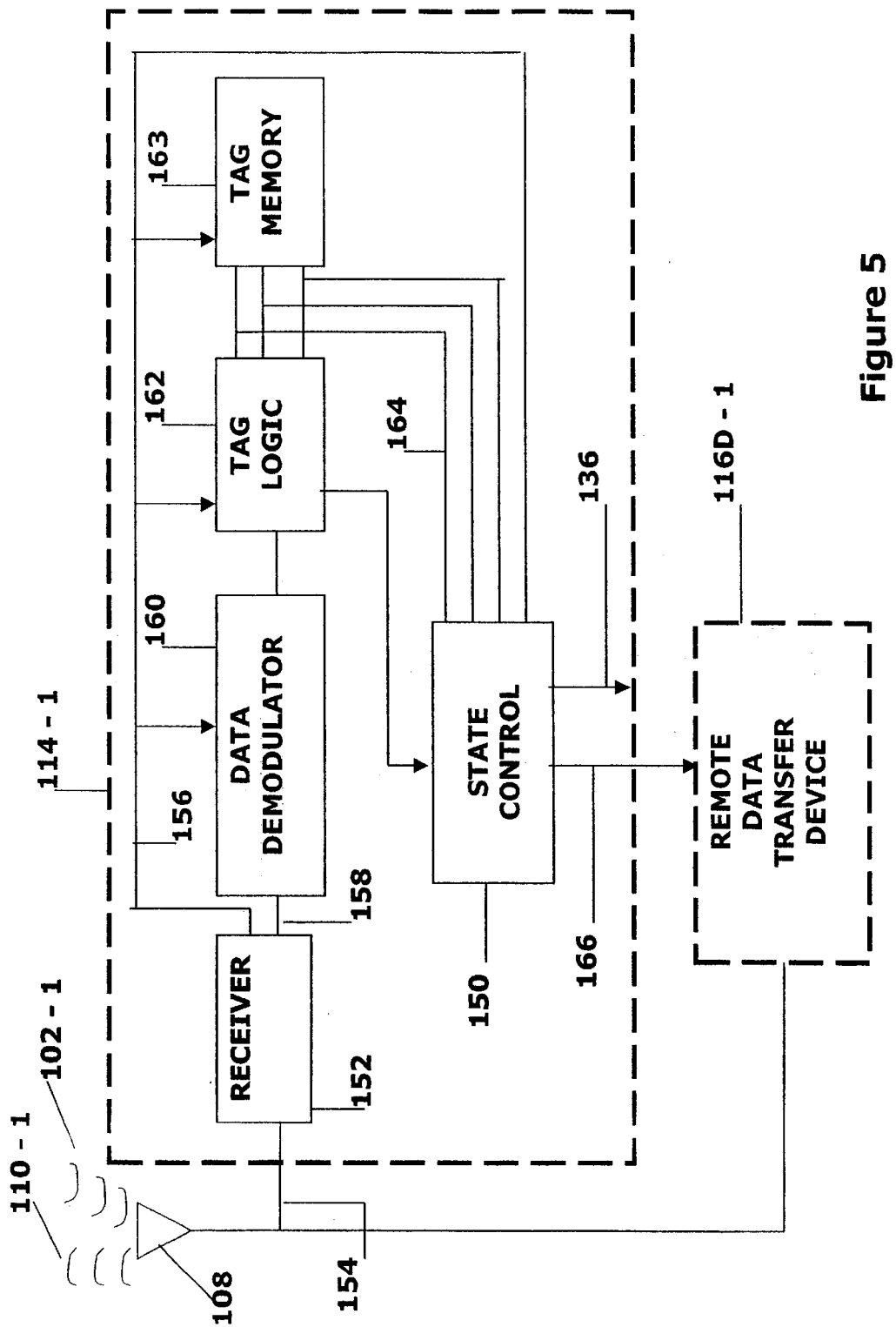
FIG. 5 is a diagram of a preferred embodiment of one of the RFID tags having the capability of a state control.

FIG. 5 shows a diagram of a fifth preferred embodiment of one of the RFID tags 114 having the capability of a state control 150. The RFID tag 114 may be referred to as the tag 114-1 to denote that it is the only and particular tag 114 that will respond to the unique signal 102-1 for causing the state control 150 to change the state of the remote data transfer device 116D-1. The RFID tag 114-1 receives the RF energy from the signal 102-1 received by the antenna 108. The RF energy of the signal 102-1 is passed to an RF tag receiver 152 over line 154. The receiver 152 extracts the power used by the tag 114-1 from the energy of the RF signal 102-1, and supplies the power to the other tag circuitry over line 156. The information from the RF signal 102-1 is received by the receiver 152 and passed as logic signals 158 to a data demodulator 160 and then to tag processing logic 162. The tag processing logic 162 responds to the information derived from the unique RF signal 102-1 and to data in the tag memory 163, and passes a logic signal 164 to the state control 150. The state control 150 generates the wake-up signal 136 which is passed over line 166 to the remote data transfer device 116D-1. The wake-up signal 136 causes the remote data transfer device 116D-1 to change state to the operational (ON) state and provide the data transfer signals 110-1 to the antenna 108. The state of the remote data transfer device 116D-1 is changed to the ON state 2 during the transmission of the RFID signal 102-1. When the remote system 106 is in the building 124 the duration of such transmission may be controlled to be adequate to change the state to the ON state without regard to factors affecting the mobile remote system shown in FIG. 3A. In the case of the mobile system, if the truck 122 is moving at 50 mph through the RFID signal 102-1 that is transmitted along five feet of the path of travel of the truck 122, then the truck 122 will take 0.07 seconds to pass through the RFID signal 102. The 0.07 seconds is adequate for the RFID tag 114-1 to respond to and become powered by the signal 102-1 and provide power for changing the state of the remote data transfer device 116D-1.

Figure 6:
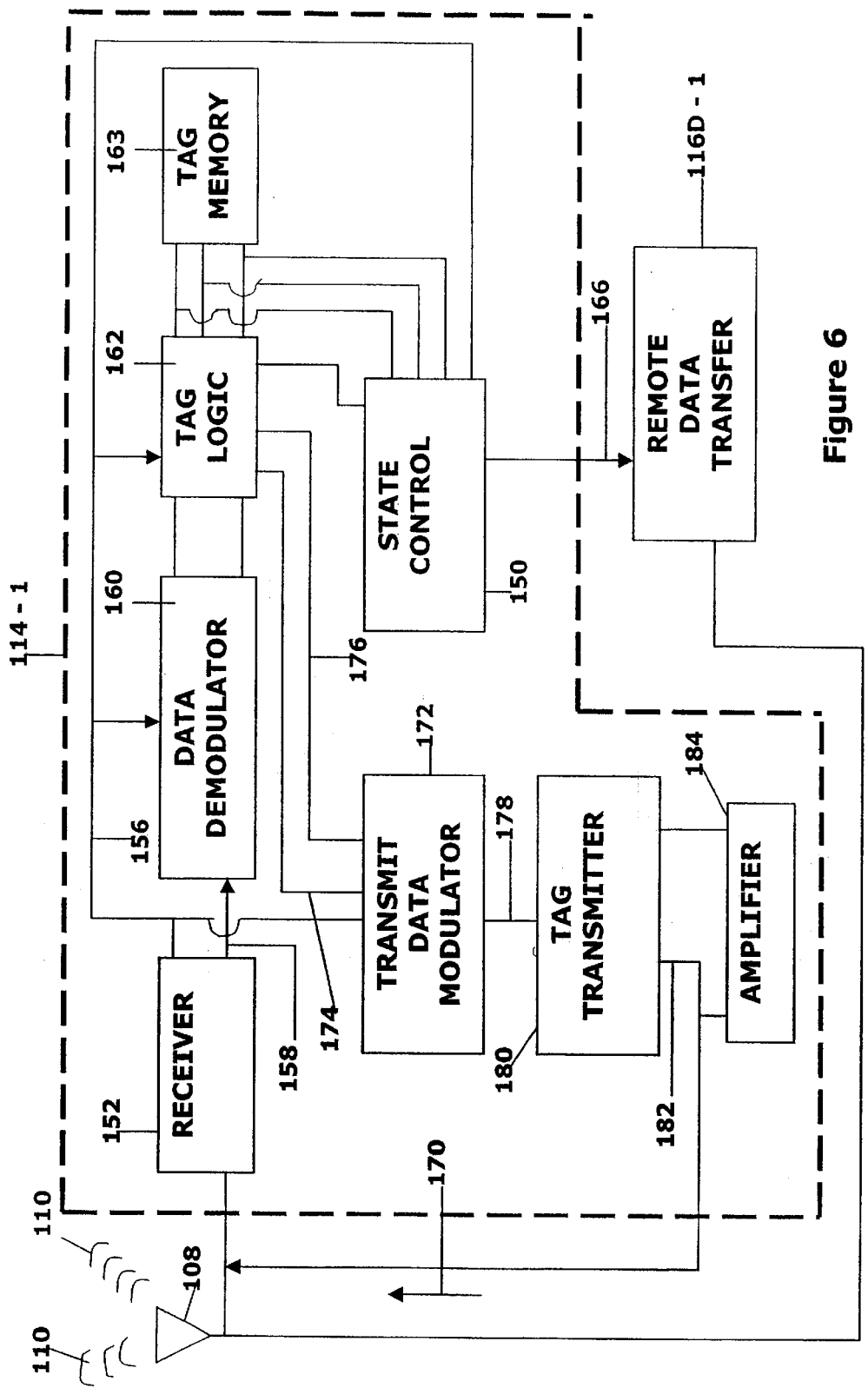
FIG. 6 is a diagram of a preferred embodiment of one of the RFID tags having the capability of transmitting modulated signals back to the base station.

FIG. 6 shows a diagram of a sixth preferred embodiment of one of the RFID tags 114-1 having the capability of a state control 150, and having the capability of transmitting modulated signals 170 back to the base station 100. FIG. 6 shows the line 156 providing power to a transmit data modulator 172. An unmodulated transmit clock signal 174 and a transmit data signal 176 are passed from the tag logic 162 to the transmit data modulator 172. The transmit data modulator 172 produces a transmit signal 178, which is passed to a tag transmitter 180. The tag transmitter 180 controls the reflectivity of the tag antenna 108 to the RF power on line 182, thereby communicating information in the modulated signals 170 from the tag logic 162 back to the base station 100. Such information may be, for example, that the tag 114-1 has been identified as the particular tag 114 that is selected to cause its associated data transfer device 116D-1 to become operative.

Alternatively, if the backscatter range of transmission of the modulated signals 170 must be greater than possible solely with the beam powering of the RFID tag 114-1, the RFID tag 114-1 may be provided with an optional battery-operated amplifier 184. In the use of the amplifier 184, the power drawn in state 1 may still be a very small amount, such as three microAmperes, to assist in extending the range of transmission of the modulated signal 170 as far as 75 meters, for example, at 2.450 GHz. In this manner, although the state 1 becomes a very low power state rather than a zero power state, the operational life of the RFID tag 114-1 is not substantially decreased because a typical battery supplied by Toshiba of Japan has a life of 1.35 Ampere-hours, which corresponds to 5600 days of battery life supplying the three microAmperes to the amplifier (assuming operation at 3.3 V).

The RFID tags 114 suitable for use with the RFID signals 102 and the remote systems 106 may be the Intellitag 500 brand RFID tags identified by Model No. MSOP and sold by the Amtech Systems Division of Intermec. The Model No. MSOP RFID tags receive incoming RFID signals, such as the signals 102, over a range of up to three meters at 2.45 GHz, for example.

Figure 7B:
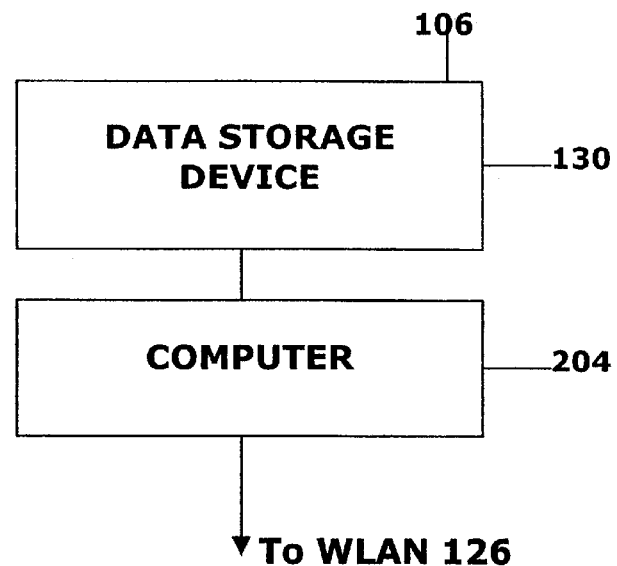
FIG. 7B is a schematic diagram showing data transfer devices that include a computer and a data storage device operating with the computer.
Figure 7A:
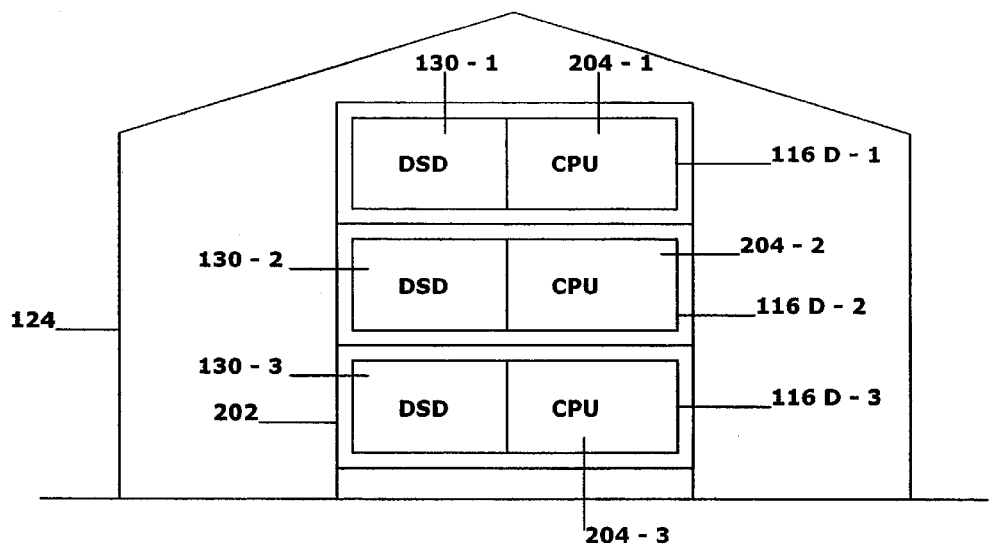
FIG. 7A is a schematic diagram showing data transfer devices of remote systems provided on or in association with every separate item that is to be identified and operated.

In the use of the remote systems 106, one remote system 106 may be provided on or in association with every separate item that is to be identified and operated. This is illustrated, for example, in FIG. 7A which shows additional details of the data transfer devices 116D of the remote systems 106 shown in FIG. 3B. A rack 202 may be used to hold inventory contained in the building 124. The inventory is shown including data storage devices 116D. The data to be provided to one or more separate data storage devices 116D-1, 116D-2, and 116D-3, for example, may be software updates, for example. Each of the data transfer devices 116D-1, 116D-2, etc. may include a computer 204 and a data storage device 130 operating with the computer 204 as shown in FIG. 7B.

Figure 7C:
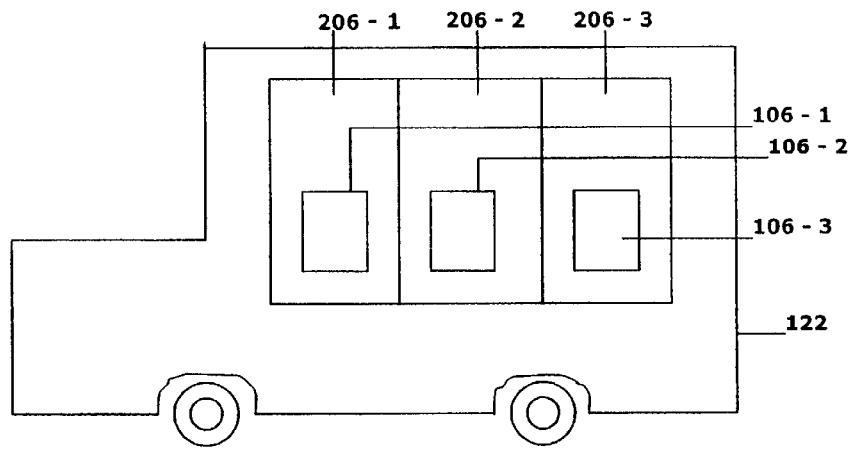
FIG. 7C is a schematic diagram showing three containers that may be carried by a truck at a remote location, wherein to facilitate the transfer of data with respect to each item of the inventory in each such container, each container may be provided with a separate remote system.
Figures 7D, 7E:
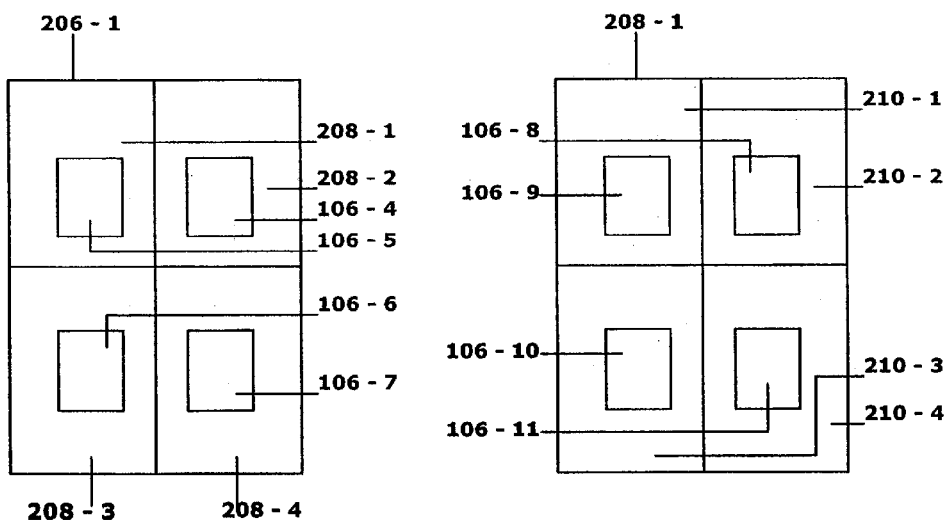
FIG. 7D is a schematic diagram showing that each container may contain many cartons, wherein to facilitate the transfer of data with respect to each item of the inventory in each such carton, each carton may be provided with a separate remote system.
FIG. 7E is a schematic diagram showing that each carton may contain many boxes, wherein to facilitate the transfer of data with respect to each item of the inventory in each such box, each box may be provided with a separate remote system.

FIG. 7C shows that with respect to the embodiment shown in FIG. 3A, three containers 206, separately identified as 206-1, 206-2 and 206-3, may be carried by the truck 122, for example. FIG. 7D shows that each container 206 may contain many cartons 208, individually identified as 208-1, 208-2, 208-3, and 208-4. FIG. 7E shows that each carton may contain many boxes 210, separately identified as 210-1, 210-2 and 210-3. To facilitate the transfer of data with respect to each item of the inventory in each such container 206, and in each carton 208, and in each box 210, each such container 206, and each carton 208, and each box 210 may be provided with a separate remote system 106, separately identified as 106-1, 106-2, 106-3, 106-4, 106-5, 106-6, 106-7, 106-8, 106-9, 106-10, and 106-11. Each such remote system 106 is provided with one of the data storage devices 130. For example, using the Model MSOP Intellitag 500 brand RFID tags 114 in many respective remote systems 106, many containers 206, or cartons 208, or boxes 210 may meet the criteria for selection which is embodied in the unique signal 102-1. In this case, many of the RFID tags 114 would respond to the unique signal 102-1. Such RFID tags 114 responding would be those in the containers 206 or cartons 208 or boxes 210 that meet the selection criteria. As one example, of twenty containers 206 that may receive the unique signal 102-1, only five of the containers 206 might be the specific containers 206 containing the particular ones of the data storage devices 130 to be turned on.

Figure 8:
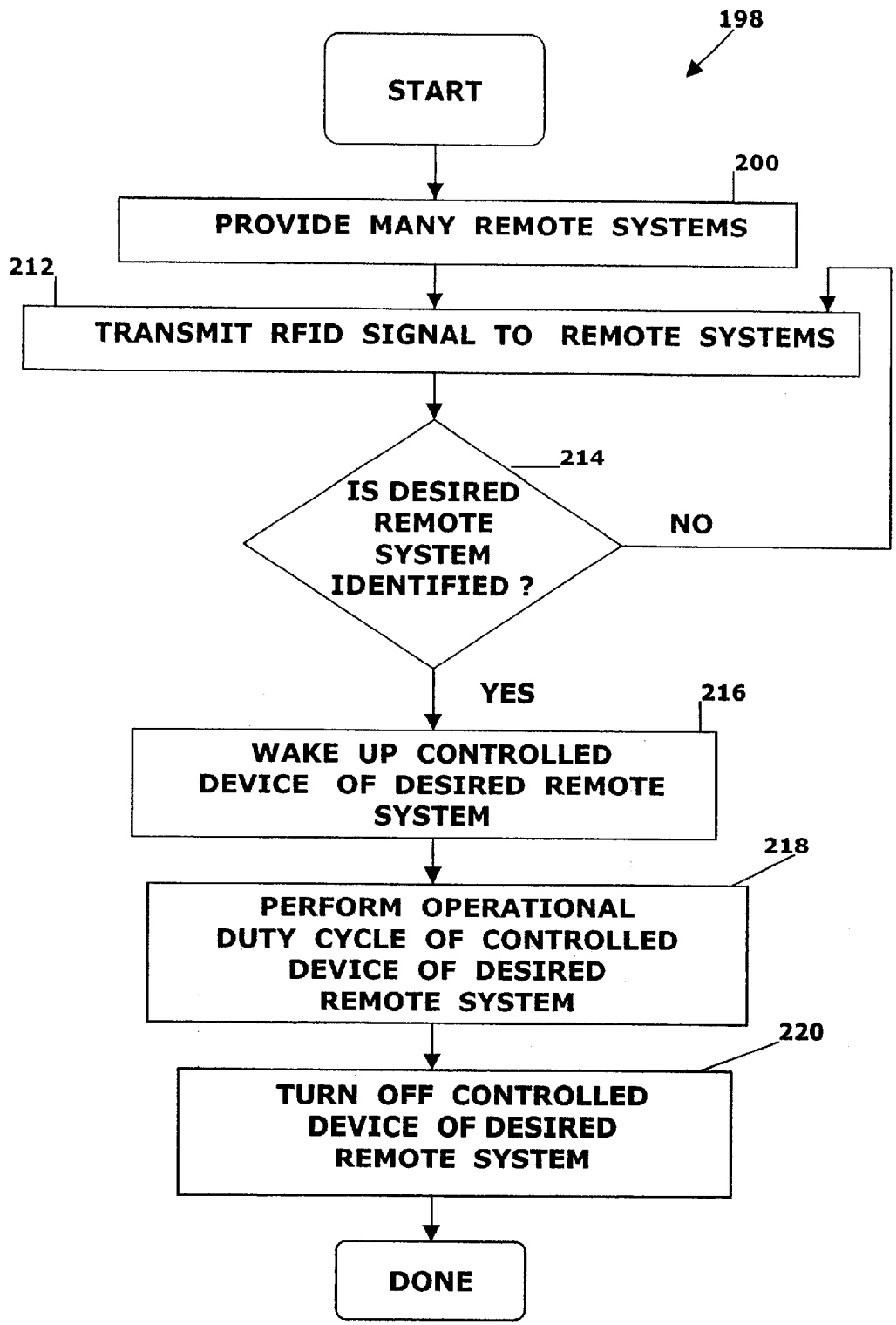
FIG. 8 is a flow chart showing operations of a method of the present invention in which a remote system normally in a zero power state is periodically caused to be in an operational state for performing an operational cycle before returning to the zero power state.

FIG. 8 shows a flowchart illustrating operations 198 of a process of periodically providing data to or from a remote area. The process starts with an operation 200 of providing in the remote area a plurality of individual remote systems 106, wherein each system 106 includes one of the data storage devices 116D shown in FIGS. 3A or FIG. 3B, for example. Each of such remote data storage devices 116D has one of the data storage devices 130 and is primarily in the zero power (OFF) state. Each such device 130 also has the operational (ON) state for operation. The data storage capacity of the remote data storage devices 130 is substantially larger than that of a typical RFID tag 114, as described above.

In operation 212 shown in FIG. 8, one of the unique RFID signals 102-1 or 102-2, etc., is periodically transmitted to the remote area only at a separate specific time at which it is desired to provide data to or from a particular one of the data storage devices 130. One of the unique signals 102 corresponds to each of the remote systems 106, and thus to one of the data storage devices 130. Thus, each unique individual one of the RFID signals 102-1, 102-2, etc. is designed to identify only the particular respective one of the remote data storage devices 130-1, 130-2, etc. that is selected. Such selection may be performed by use of a respective one of the RFID tags 114-1, 114-2, etc.

In response to the unique RFID signal 102-1, for example, in operation 214 a determination is made as to whether the selected one of the remote systems 106-1, with the corresponding data storage device 130-1, has been identified. If it is determined that the selected one of remote systems 106-1 and the corresponding data storage device 130-1 has not been identified, then the process moves back to operation 212 for another transmission of a signal 102. If it is determined that the selected one of the remote systems 106-1 (and the corresponding data storage device 130-1) has been identified, then the process moves to wake-up operation 216 in which the state of the desired controlled device 116 (i.e., of the data transfer device 116D-1) is changed to the operational ON state. The desired controlled device 116 corresponds to and is associated with the specific RFID tag 114-1 that responds to the signal 102-1, for example.

The process then moves to operation 218 in which the operations of the operational ON state are performed. That is, data is transferred to and from that selected data storage device 130-1, and in particular, to and from the data storage device 130-1 via the wireless local area network (WLAN) 126-1. Thus, data communication is established with a particular remote data storage device 130-1 only when that data storage device 130-1 is selected and is in the operational state.

Upon completion of the operations of the operational state, operation 220 is performed to turn off the remote system 106-1, which returns the system 106-1 to the zero power OFF state, and the process is DONE.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for remotely causing operation of a particular unit of electronic circuitry among a plurality of electronic circuitry, comprising:
   a plurality of units of the electronic circuitry, each of the units of electronic circuitry having first and second states, each of the units of electronic circuitry being powered by a limited capacity power supply, a first of the states using zero power from the power supply, a second of the states being an operational power-on state using power from the power supply;
   a base station for sending a wake-up signal only at a specific time at which it is desired to change the state of the particular unit of the electronic circuitry from the first state to the second state;
   a separate radio frequency identification tag electrically connected to each of the units of the electronic circuitry, only a specific one of the tags being responsive to the wake-up signal to cause the state of the respective connected particular unit of the electronic circuitry to change between the first state and the second state; and
   the base station sending successive ones of the wake-up signals only at separate specific times at which it is desired to change the state of the particular unit of the electronic circuitry from the first state to the second state, the duration of the second operational state of the particular unit of electronic circuitry being short relative to the time between successive wake-up signals for the particular unit of electronic circuitry, and
   wherein the particular unit of electronic circuitry returns to the first state at the end of the duration of the second state.

2. A system as recited in claim 1, wherein each of the radio frequency identification tags has a first data storage capacity, and wherein each data storage device of each unit of electronic circuitry has a second data storage capacity substantially exceeding the first data storage capacity of the respective connected radio frequency tag.

3. A system as recited in claim 2, further comprising:
   each of the units of electronic circuitry being a sensor for detecting conditions of the human body; and
   the respective radio frequency tag being mounted on the sensor, the respective radio frequency tag being passive and operating using the power of the signal of the base station.

4. A system as recited in claim 1, further comprising:
   each particular unit of the electronic circuitry and each respective radio frequency tag being mounted on a respective mobile carrier that moves remotely from the base station.

5. A system as recited in claim 1 wherein each unit of electronic circuitry is connected a wireless communication device and a data storage device, upon operation of the particular unit the wireless communication device being effective to provide data communication with the respective data storage device independently of the wake up signal from the base station.

6. A system as recited in claim 5, further comprising;
   at least one unit of the electronic circuitry being the particular unit and including at least one computer at a location remote from the base station;
   a system administrator periodically having updates for the at least one computer of the particular unit of electronic circuitry;
   the base station sending the wake-up signal; and
   the wireless communication device communicating the update from the system administrator to the at least one computer of the particular unit of electronic circuitry during the second state.

7. A system as recited in claim 1, wherein each respective radio frequency identification tag is passive and being powered so that the state of the respective connected particular unit of electronic circuitry is changed between the first state and the second state only using the power of the wake-up signal from the base station.

8. The system of claim 1, wherein the particular unit of electronic circuitry is associated with a wireless communication device.

9. A system for transferring data from time to time to or from a remote location, comprising;
   a data transfer unit having first and second states, the unit being powered by a source having a limited power capacity, a primary one of the states being a state using zero power from the source, an operational one of the states being a power-on state using power from the source, that data transfer unit comprising a data storage device having a first data storage capacity and a wireless communication device for communicating data from or to the data storage device respectively to or from the remote location;

a radio frequency identification tag provided with a second data storage device having a second data storage capacity substantially less than the first data storage capacity, the tag being electrically connected to the data transfer unit, the tag being responsive to a radio frequency identification signal that specifically selects the data transfer unit and causing the state of the data transfer unit to change between the primary state and the operational state, wherein the data transfer unit becomes operational upon the change of state at the specific time so that the wireless communication device communicates data from or to the data storage device respectively to or from the remote location.

10. A system as recited in claim 9, wherein the radio frequency identification tag is a passive tag powered only by the radio frequency identification signal.

11. A method of remotely causing operation of a controlled device in a remote area, the method comprising the steps of:

providing a plurality of controlled devices in a remote area, each controlled device normally being in an off-state and having an on-state for operation and each controlled device having an operational cycle and each controlled device being coupled to at least one radio frequency identification tag;

transmitting separate radio frequency identification (RFID) signals to the remote area at separate specific times, these signals including at least one signal to identify a selected one of the controlled devices;

in response to the at least one signal identifying the selected one of the controlled devices;

causing the selected controlled device to be in the on-state;

performing the operational duty cycle of the selected controlled device; and returning the selected controlled device to the off-state.

12. The method of claim 11, wherein the controlled devices each comprise at least one data storage unit with a relatively high data storage capacity and the at least one radio frequency identification tag having a data storage capacity that is small relative to the data storage capacity of the data storage unit; and the operational duty cycle includes communicating to or from the remote area.

13. The method of claim 12, wherein the communicating to or from the remote area is distinct from the transmitting of the RFID signals to the remote area.

14. The method of claim 12, wherein the data storage units further comprise:

a disc drive having a high data storage capacity.

15. The method of claim 12, further comprising the steps of:

using a wireless communication device to communicate data from the data storage unit when the selected controlled device is in the on-state.

16. The method of claim 11, wherein each controlled device has a limited power supply for providing power to the controlled device and including the further step of providing power for the identifying and causing operations from the radio frequency signals independently of the limited power supply.

17. The method of claim 11, wherein the selected one of the controlled devices is a wireless communication device.

\* \* \* \* \*